(12) United States Patent
Frejd et al.

(10) Patent No.: US 7,462,005 B2
(45) Date of Patent: Dec. 9, 2008

(54) DRILLING TOOL FOR CHIP REMOVING MACHINING

(75) Inventors: Stefan Frejd, Söderköping (SE); Maria Samuelsson, Norrköping (SE)

(73) Assignee: Seco Tools AB, Fagersta (SE)

( * ) Notice: Subject to any disclaimer, the term of this patent is extended or adjusted under 35 U.S.C. 154(b) by 375 days.

(21) Appl. No.: 11/164,758

(22) Filed: Dec. 5, 2005

(65) Prior Publication Data

US 2006/0210369 A1 Sep. 21, 2006

(30) Foreign Application Priority Data

Dec. 14, 2004 (SE) .................................. 0403024

(51) Int. Cl.
*B23B 51/00* (2006.01)

(52) U.S. Cl. .................. 408/180; 406/231; 407/36; 407/46

(58) Field of Classification Search .............. 408/180, 408/227, 231; 407/36, 46
See application file for complete search history.

(56) References Cited

U.S. PATENT DOCUMENTS

| | | | | |
|---|---|---|---|---|
| 2,962,800 A * | 12/1960 | Swenson | ..................... | 407/9 |
| 3,286,557 A * | 11/1966 | Rietzler et al. | ............... | 408/179 |
| 3,644,050 A * | 2/1972 | Schiller | .................... | 408/197 |
| 4,311,418 A * | 1/1982 | Erkfritz et al. | ................. | 407/39 |
| 4,318,647 A * | 3/1982 | Erkfritz | ................... | 408/153 |
| 4,393,735 A | 7/1983 | Eckle et al. | | |
| 4,470,731 A * | 9/1984 | Erkfritz | ................... | 407/38 |
| 4,611,959 A * | 9/1986 | Kress et al. | .................. | 408/180 |
| 4,631,994 A * | 12/1986 | Jester et al. | ................... | 82/158 |
| 4,692,069 A * | 9/1987 | Kieninger | ..................... | 407/39 |
| 4,927,301 A | 5/1990 | Reiterman | | |
| 4,964,763 A * | 10/1990 | Kieninger | ..................... | 407/40 |
| 5,139,371 A * | 8/1992 | Kraft et al. | .................. | 407/101 |
| 5,147,157 A * | 9/1992 | Pawlik | ....................... | 407/36 |
| 5,154,551 A * | 10/1992 | Noggle | ....................... | 408/180 |
| 5,156,501 A | 10/1992 | Pawlik et al. | | |
| 5,320,458 A * | 6/1994 | Reiterman et al. | .......... | 408/180 |
| 5,336,026 A * | 8/1994 | Noggle | ....................... | 408/147 |
| 5,567,092 A * | 10/1996 | Post | ............................ | 407/38 |
| 5,913,643 A * | 6/1999 | Fowler et al. | ................. | 407/36 |
| 6,016,720 A * | 1/2000 | Pantzar | ....................... | 76/115 |
| 6,173,637 B1 * | 1/2001 | Hubert et al. | ............ | 83/698.41 |
| 6,601,620 B1 * | 8/2003 | Monyak et al. | .......... | 144/24.12 |
| 6,692,198 B2 * | 2/2004 | Kress | .......................... | 407/36 |
| 6,702,526 B2 * | 3/2004 | Gamble et al. | ................ | 407/36 |
| 6,971,823 B2 * | 12/2005 | Satran et al. | .................. | 407/46 |
| 7,163,360 B2 * | 1/2007 | Toyose | ....................... | 407/36 |
| 7,311,478 B2 * | 12/2007 | Erickson et al. | ............... | 407/48 |

* cited by examiner

*Primary Examiner*—David P Bryant
*Assistant Examiner*—Eric A Gates
(74) *Attorney, Agent, or Firm*—WRB-IP LLP

(57) ABSTRACT

The present invention relates to a drilling tool for chip removing machining, wherein the drilling tool comprises a shank and an attachment, wherein the shank and the attachment are integrated with each other, wherein the shank has a free end, wherein between the free end and the attachment is provided at least one adjustable cassette which is received in a cassette pocket of the shank, and wherein an indexable cutting insert for chip removing machining is received in the cassette. The cassette has a circular cylindrical peripheral surface, the cassette pocket has a circular cylindrical support surface which is adapted to cooperate with the peripheral surface, a screw is provided for pivotable anchorage of the cassette in the cassette pocket, and the cassette and the cassette pocket has a screw to effect rotation of the cassette in the cassette pocket.

15 Claims, 4 Drawing Sheets

DRILLING TOOL FOR CHIP REMOVING MACHINING

The present invention relates to a drilling tool for chip removing machining.

Through U.S. Pat. No. 4,393,735 is previously known a tool for turning or boring, whereby this tool comprises one or more cassettes. Each cassette receives a cutting insert for chip removing machining. The cassette is fixed relative to a holder of the tool by bringing a screw of the holder to cooperate with an internally threaded hole of the cassette. The drawback of the prior tool is that the cassette has poor precision.

Through U.S. Pat. No. 5,156,501 is previously known a face milling cutter where the cutting insert is carried by a cassette with a circular cylindrical peripheral surface. The cassette is received in a corresponding recess in the milling cutter body. A set screw threaded into the milling cutter body cooperates via its head with a cassette, whereby this can be brought to revolve in its recess. The drawback with that prior tool is limited precision in the radial direction, i.e. this prior constructive design does not fit in connection with a drilling tool.

Through U.S. Pat. No. 4,927,301 is previously known a boring tool, where numerous cutting inserts, via cassettes, are provided on the tool body. Each cutting insert is mounted in a cassette, which has a curved surface. The tool body has recesses with a correspondingly curved surface, whereby a cassette is received in a recess. A relative displacement between the cooperating curved surfaces occurs at adjustment of the cassette in the recess. In this case an adjustment of the position of the cutting insert occurs in a direction perpendicularly to the rotational axis of the tool, however the cutting inserts are generally positioned with their major plane situated along the rotational axis. A definite drawback with this tool is that the possibility of adjustment of the cutting inserts in the radial direction of the tool is outstandingly limited.

It is desirable to provide a drill by means of which drill coarse machining and fine machining can be done in one operation.

It is desirable to provide a drill by means of which drill the degree of fine machining shall be adjustable.

It is desirable to provide a drill wherein the adjustment of the cassette shall proceed in an outstandingly user friendly manner.

It is desirable to provide a drill wherein the cassette shall be fixed relative to the drill body at insert change.

It is desirable to provide a drill wherein the position of the cutting insert located in the cassette will not be changed at use of the tool.

According to an aspect of the present invention, drilling tool for chip removing machining comprises a shank, and an attachment, the shank and the attachment being integrated with each other, the shank having a free end. At least one adjustable cassette is provided between the free end and the attachment, the cassette being received in a cassette pocket of the shank. An indexable cutting insert for chip removing machining is received in the cassette. The cassette has a circular cylindrical peripheral surface, the cassette pocket having a circular cylindrical support surface adapted to cooperate with the peripheral surface. First means for pivotable anchorage of the cassette in the cassette pocket, and second means to effect rotation of the cassette in the cassette pocket are provided.

BRIEF DESCRIPTION OF THE DRAWINGS

Below preferred embodiments of the invention will be described, wherein reference is made to the enclosed drawings, wherein.

DETAILED DESCRIPTION

Figure 1:
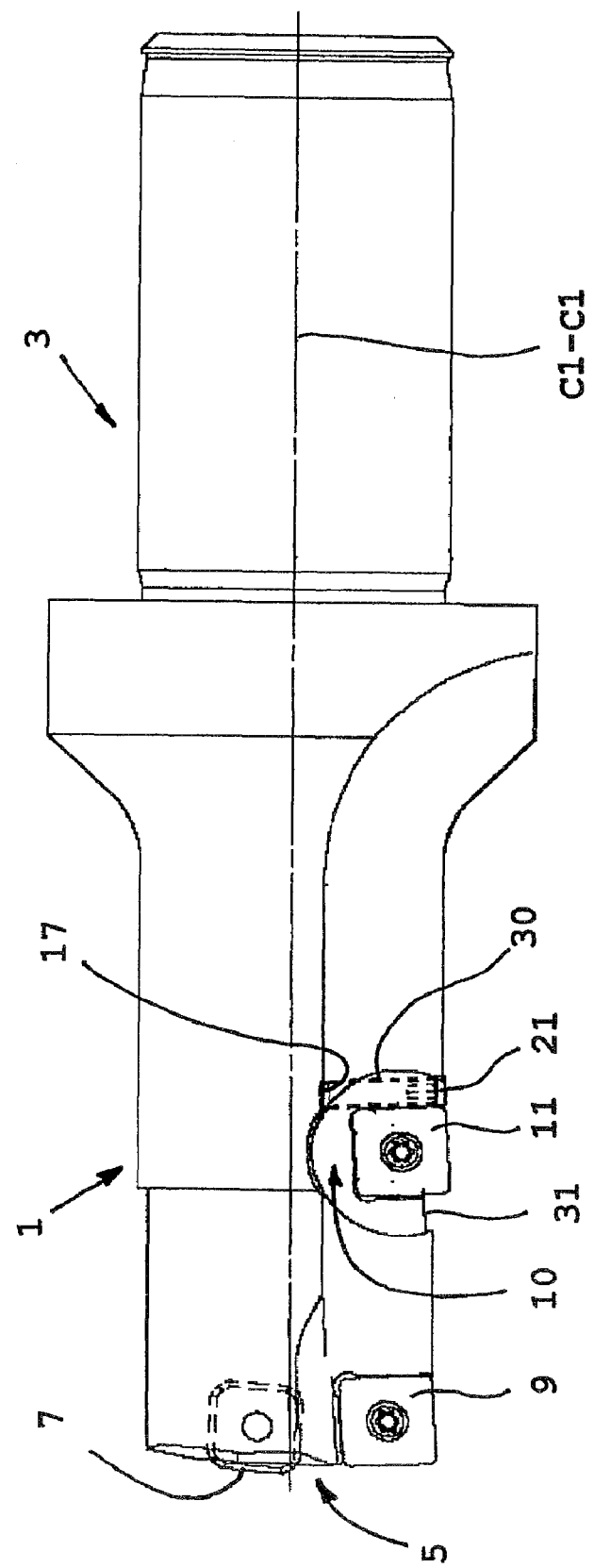
FIG. 1 shows a plane view of a tool according to the present invention, whereby the tool is provided with an adjustable cassette.
Figure 2:
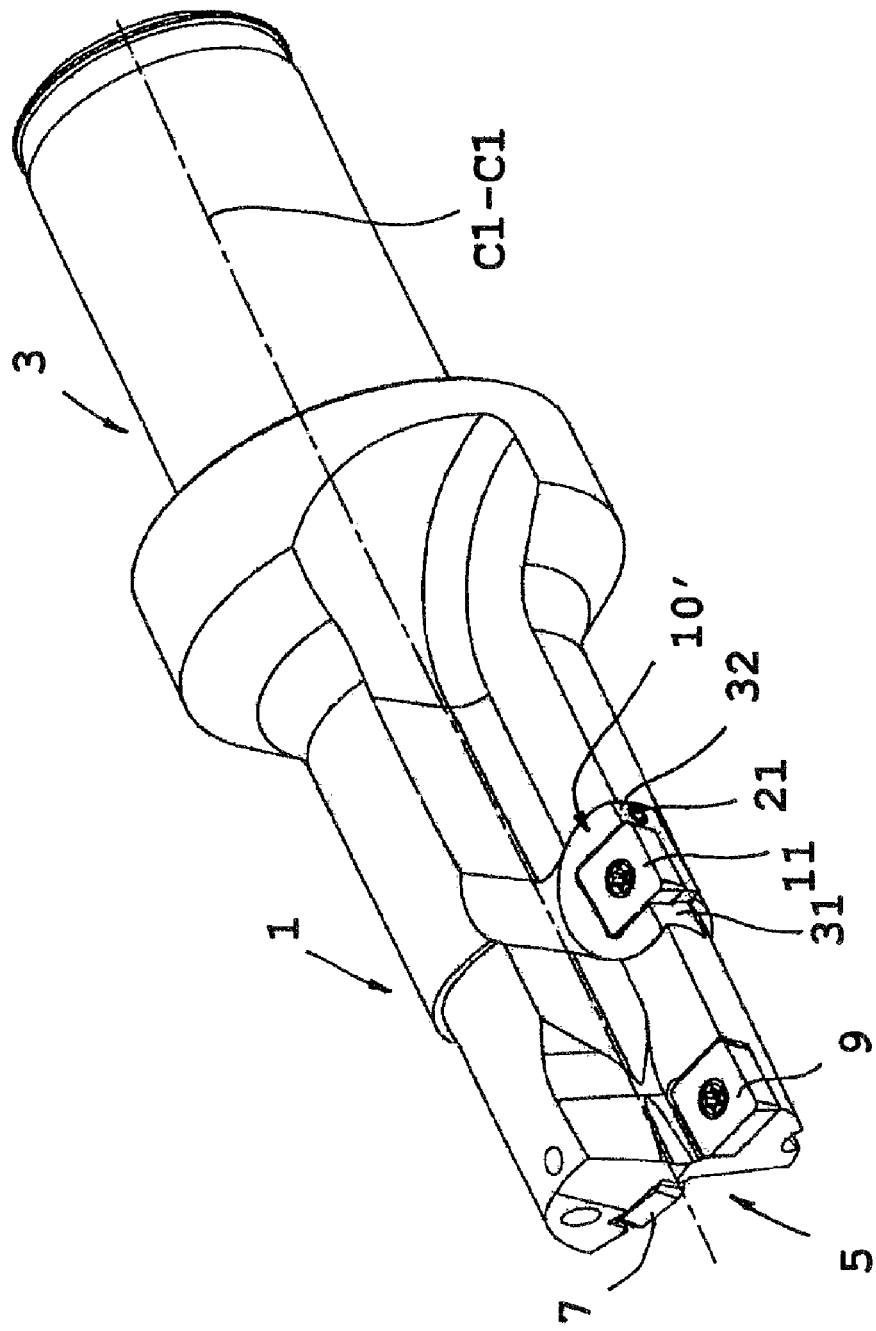
FIG. 2 shows a perspective view obliquely from the front of the tool according to FIG. 1.

The drill according to the present invention shown in FIGS. 1 and 2 comprises a shank 1 and an attachment 3, whereby the shank 1 and the attachment 3 are integrated with each other. The shank 1 has a tip forming end 5 and two indexable cutting inserts 7 and 9 for chip removing machining are provided in the area of this end 5. As seen for example in FIG. 2, an axially extending chip channel can be provided in connection to, i.e., between each cutting insert 7 and 9. The first indexable cutting insert 7 is a central insert while the second indexable cutting insert 9 is a peripheral insert. The central insert 7 and the peripheral insert 9 are in a conventional manner fixed in their respective insert pockets in the shank 1 by means of first and second locking screws 6 and 8, respectively. The attachment 3 is intended to be received in a holder of a machine tool (not shown). A center axis/rotational axis for the tool is depicted by C1-C1 in FIG. 2.

Figure 3:
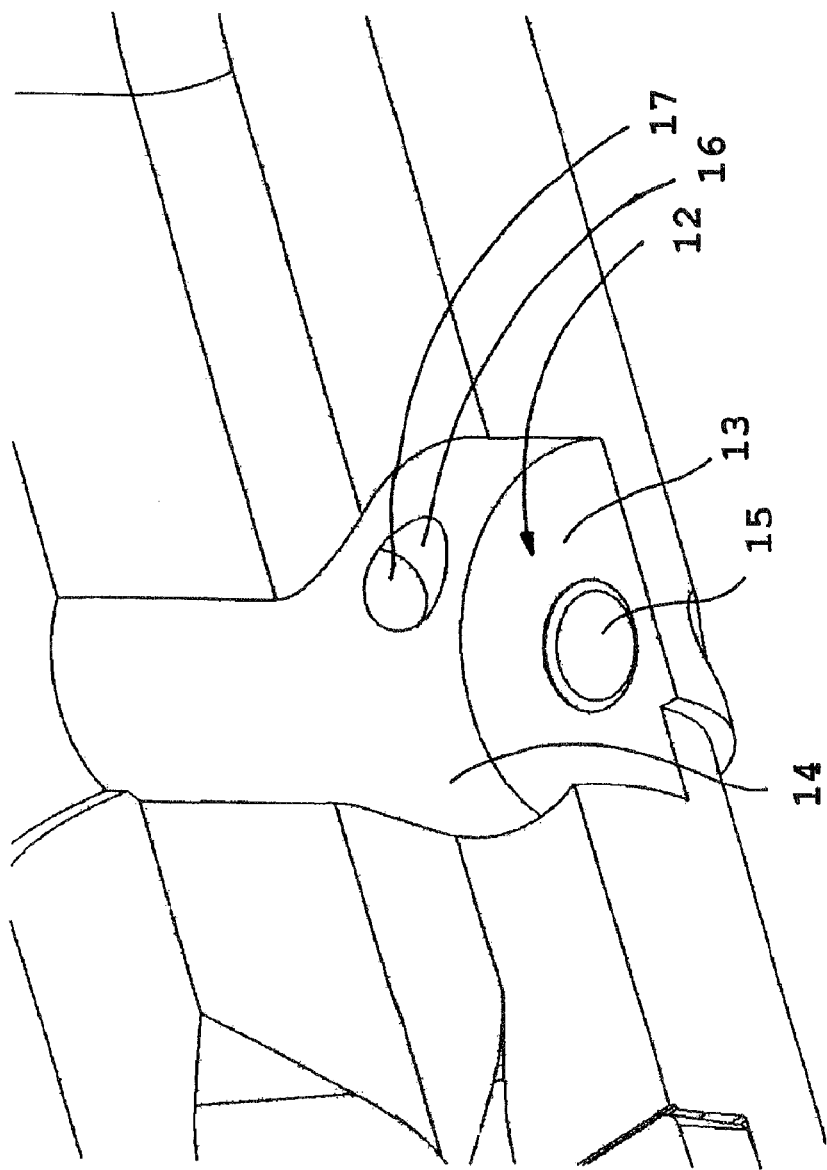
FIG. 3 shows in detail a perspective view of the pocket of the tool, in which the cassette shall be received.

The shank 1 of the drill is provided with a cassette 10 between the tip forming end 5 and the attachment 3, which cassette in turn carries a third indexable cutting insert 11. The cassette 10 is mounted in a cassette pocket 12, which is shown in FIG. 3. The cassette pocket 12 comprises a first, planar support surface 13, a second circular cylindrical support surface 14, a first internally threaded fastening hole 15 and a recess or blind hole 16 with a lateral bottom surface 17. The cassette 10 can be mounted in the cassette pocket 12 such that the outer surface of the third cutting insert 11 lies flush with an associated axial channel surface, thereby avoiding obstructing chip flow in the associated chip channel. In other words, the axial channel surface, the outer surface of the third cutting insert and the outer surface of the cassette form a substantially continuous surface when the expression "outer surface" refers to a view according to FIG. 1.

Figure 4:
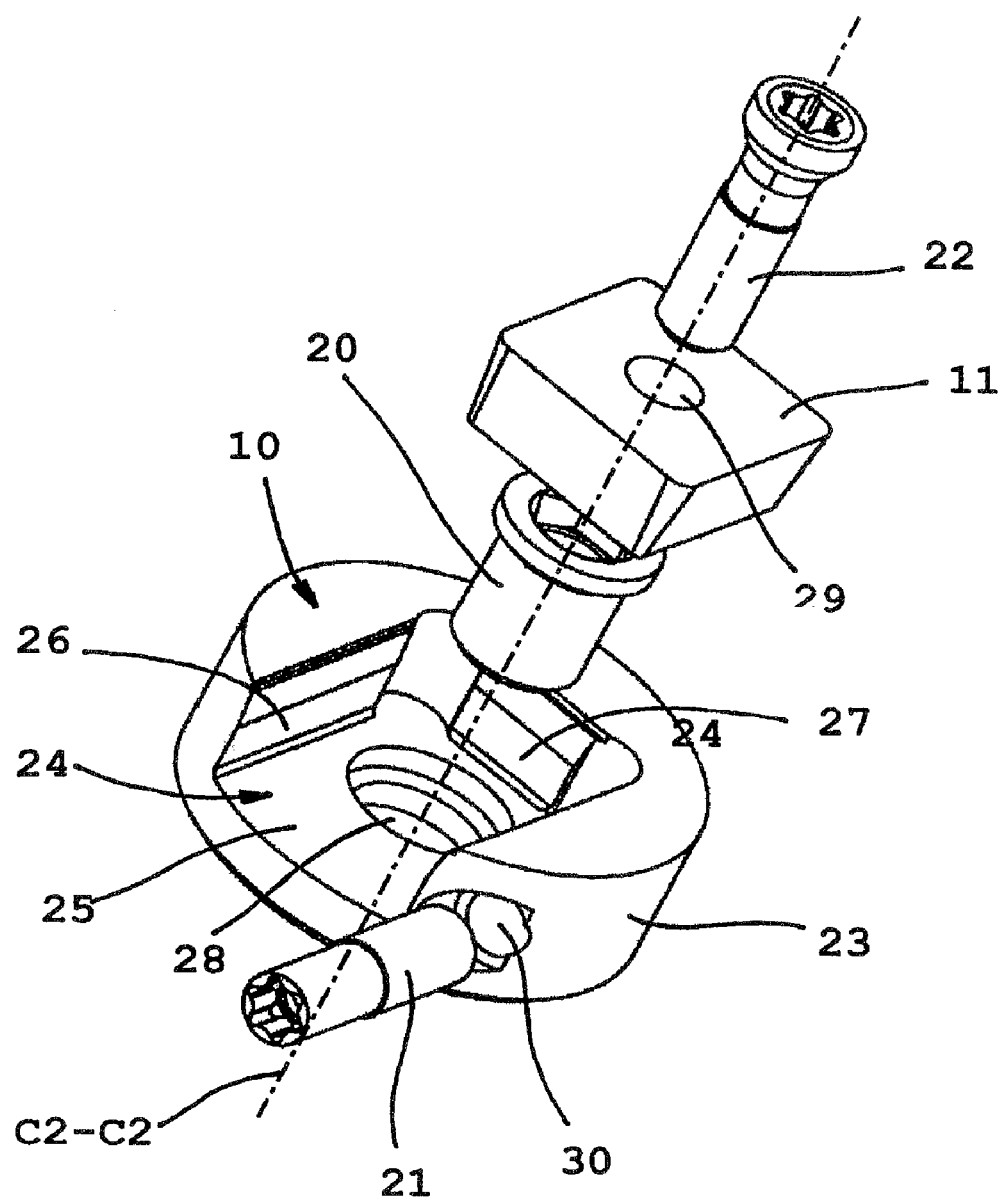
FIG. 4 shows a perspective exploded view of a cassette and a cutting insert with associated surrounding equipment.

In FIG. 4 are shown the cassette 10, a first means or a sleeve-shaped screw 20 for anchorage of the cassette 10 in the cassette pocket 12, see FIG. 3, a set screw 21 for adjustment of the position of the cassette 10 in the cassette pocket 12, the third indexable cutting insert 11 and a third locking screw 22 for fixation of the third indexable cutting insert 11 in the cassette 10. The center axis of the cassette 10 is depicted by C2-C2. The free end of the set screw 21 is in operative position intended to cooperate with the bottom surface 17 of the recess 16, whereby this bottom surface 17 consequently constitutes a third, planar support surface for the free end of the set screw 21.

The cassette 10 shown in FIG. 4 has a circular cylindrical peripheral surface 23 and an abutment surface (hidden in FIG. 4), which extends perpendicular to the center axis C2-C2 of the cassette 10. The cassette 10 also has a cutting insert pocket 24, in which the indexable cutting insert 11 is intended to be received. Generally, the cutting insert pocket 24 is defined by a bottom surface 25 and three side surfaces 26 and 27, of which one is hidden in FIG. 4. A first center hole 28 is formed in the bottom surface 25 of the cutting insert pocket 24, in which the sleeve-shaped screw 20 is intended to be received. Thereby, the center of the first center hole 28 coincides with the center of the circular cylinder that defines the peripheral surface 23. A second center hole 29 is formed in the indexable cutting insert 11, in which the locking screw 22 is intended to be received.

The center axis C2-C2 is also the center axis of the sleeve-shaped screw 20, the third locking screw 22, the first center hole 28 and the second center hole 29.

The set screw 21 forming part of the cassette 10 is externally threaded and received by a second internally threaded fastening hole 30, which is through-going.

When mounting the cassette 10' in the cassette pocket 12 the abutment surface of the cassette 10' is brought to abutment against the first support surface 13 of the cassette pocket 12 and the peripheral surface 23 of the cassette 10' comes to abutment against the second support surface 14 of the cassette pocket 12. The sleeve-shaped screw 20 is threaded into the fastening hole 15 and the cassette 10' is correctly anchored in the cassette pocket 12. When the cassette 10' is properly mounted in the cassette pocket 12 the center axis C2-C2 of the cassette 10' is perpendicular to the center axis/rotational axis C1-C1 of the tool.

At a comparing study of FIGS. 1 and 2 on one hand and FIG. 4 on the other hand it is evident that the cassette 10 in FIG. 4 generally has an external circular cylindrical peripheral surface 23 while the cassette 10 in FIGS. 1 and 2 has two outwardly facing chamfered portions 31 and 32. For that reason reference numeral 10 is used for the basic shape and 10' is used for the modified embodiment. From FIG. 2 is most clearly evident that the modification of the cassette 10 is made such to obtain a cassette 10' that is adapted to the shape of the shank 1, in which the cassette 10' is received. Thus, the chamfered portions 31 and 32 of the cassette 10' connect well to the adjacent portions of the shank 1.

A basic idea of the present invention is that the cassette 10' shall be able to be adjusted with regard to the cassette pocket 12 to which it is mounted. For that purpose the cassette 10' has a set screw 21, which is received in the second internally threaded fastening hole 30.

When mounting the cassette 10' in the cassette pocket 12 the sleeve-shaped screw 20 extends through the first center hole 28 and is brought into engagement with the fastening hole 15 of the cassette pocket 12. In this connection shall be noted that a complete tightening of the sleeve-shaped screw 20 does not occur but this is tightened only provisionally, i.e. the cassette 12 will be able to pivot relative to the sleeve-shaped screw 20. Subsequently, the indexable cutting insert 11 is mounted in its cutting insert pocket 24 in the cassette 10', and the indexable cutting insert 11 is fixed relative to the cassette 10' by complete tightening the locking screw 22. Subsequently, adjustment of the position of the indexable cutting insert 11/the cassette 10' occurs.

At rotation of the set screw 21 a mutual displacement of the cassette 10' and the set screw 21 happens. To effect adjustment/rotation of the cassette 10' the end of the set screw 21 is brought to abutment against the bottom surface 17 of the recess 16. This is schematically illustrated in FIG. 1, where the bottom surface is depicted by the reference numeral 17. The set screw 21 is shown with dashed lines in sections where it is hidden.

At rotation of the set screw 21 in a certain direction, when the free end of the set screw 21 is in contact with the bottom surface 17, the cassette 10' will pivot in a certain direction. Responsive to the rotational direction of the set screw 21 a desired pivot direction for the cassette 10' can be obtained.

When the indexable cutting insert 11/the cassette 10' has been adjusted to the desired position the indexable cutting insert 11 is dismantled and a complete tightening is made to the sleeve-shaped screw 20 such to ensure that the cassette 10' is fixed relative to the shank 1. Subsequently, the indexable cutting insert 11 is again mounted in the cutting insert pocket 24 and a complete tightening of the locking screw 22 occurs. The drilling tool is now ready to use.

A surface comprising the cutting edges of the cutting insert 11 held by the cassette 11 can be provided essentially plane parallel to a surface comprising the cutting edges of the peripheral cutting insert 9.

The above-captioned embodiment of the present invention relates to a full face drill, i.e. a tool that performs chip removing machining at the area of its tip forming end 5. However, the present invention also includes so called boring tools, i.e. tool that machines an existing hole. The tool according to the present invention consequently can have different design regarding the tip forming end of the shank.

The disclosures in Swedish patent application No. 0403024-3, from which this application claims priority are incorporated herein by reference.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. Drilling tool for chip removing machining, comprising a shank,
   an attachment, the shank and the attachment being integrated with each other, the shank having a free end,
   at least one adjustable cassette between the free end and the attachment, the cassette being received in a cassette pocket of the shank,
   an indexable cutting insert for chip removing machining received in the cassette,
   the cassette having a circular cylindrical peripheral surface, the cassette pocket having a circular cylindrical support surface adapted to cooperate with the peripheral surface,
   an anchor for pivotable anchorage of the cassette in the cassette pocket, and
   a set screw arrangement for effecting rotation of the cassette in the cassette pocket, wherein the set screw arrangement comprises an internally threaded opening in the cassette for mating with an external thread on a set screw and an abutment surface in the cassette pocket for abutting an end of the set screw.

2. Drilling tool according to claim 1, wherein the set screw arrangement for effecting rotation of the cassette in the cassette pocket comprises a planar support surface provided in connection with the cassette pocket, a set screw and a through-going fastening hole formed in the cassette, the set screw being adapted to be received in the fastening hole.

3. Drilling tool according to claim 2, wherein the cassette has a first center hole, a center of the first center hole coinciding with a center of the circular cylinder that defines the peripheral surface.

4. Drilling tool according to claim 2, wherein the anchor comprises a sleeve-shaped screw, and wherein a locking screw for the indexable cutting insert is adapted to cooperate with the sleeve-shaped screw.

5. Drilling tool according to claim 2, wherein the fastening hole is positioned to a side of a cutting insert pocket of the cassette carrying the indexable cutting insert.

6. Drilling tool according to claim 5, wherein the cassette has a first center hole, a center of the first center hole coinciding with a center of the circular cylinder that defines the peripheral surface.

7. Drilling tool according to claim 6, wherein the anchor comprises a sleeve-shaped screw, and wherein a locking screw for the indexable cutting insert is adapted to cooperate with the sleeve-shaped screw.

8. Drilling tool according to claim 1, wherein the cassette has a first center hole, a center of the first center hole coinciding with a center of the circular cylinder that defines the peripheral surface.

9. Drilling tool according to claim 1, wherein the anchor comprises a sleeve-shaped screw, and wherein a locking screw for the indexable cutting insert is adapted to cooperate with the sleeve-shaped screw.

10. Drilling tool according to claim 9, wherein the cassette has a first center hole, a center of the first center hole coinciding with a center of the circular cylinder that defines the peripheral surface.

11. Drilling tool according to claim 1, wherein the cassette has radially outwardly facing chamfered portions.

12. Drilling tool according to claim 1, comprising a peripheral cutting insert at the free end, wherein a surface comprising cutting edges of the indexable cutting insert is substantially plane parallel to a surface comprising cutting edges of the peripheral cutting insert.

13. Drilling tool according to claim 1, wherein the tool is a full face drill.

14. Drilling tool according to claim 1, wherein an axially extending chip channel is provided in the tool.

15. Drilling tool according to claim 14, wherein an axially extending chip channel is provided between a central insert and a peripheral insert.

* * * * *